United States Patent [19]

Chang et al.

[11] 4,267,100

[45] May 12, 1981

[54] PROCESS FOR FORMING AN EGG WHITE SUBSTITUTE

[75] Inventors: Pei K. Chang, Montrose; Mary C. Concilio-Nolan, New York, both of N.Y.

[73] Assignee: Stauffer Chemical Company, Westport, Conn.

[21] Appl. No.: 837,119

[22] Filed: Sep. 28, 1977

Related U.S. Application Data

[63] Continuation of Ser. No. 582,489, May 30, 1975, abandoned.

[51] Int. Cl.³ .................................................. A23J 1/20
[52] U.S. Cl. ................................. 260/112 R; 426/583; 426/614
[58] Field of Search ................... 260/112 R; 426/614, 426/583

[56] References Cited

U.S. PATENT DOCUMENTS

| | | | |
|---|---|---|---|
| 2,391,559 | 12/1945 | Faulkner | 99/57 |
| 3,404,142 | 10/1968 | Shank | 260/112 R |
| 3,687,928 | 8/1972 | Brouwer | 260/122 |
| 3,922,375 | 11/1975 | Dalan | 426/583 |
| 3,969,337 | 7/1976 | Lauer | 260/112 R |

*Primary Examiner*—Paul R. Michl
*Attorney, Agent, or Firm*—Richard P. Fennelly

[57] ABSTRACT

An egg white substitute is formed from whey proteins by adjusting a water solution containing the whey protein to a pH of from about 11 to about 13 and thereafter reducing the pH to a value of about 4.0 to about 6.0 to produce a water solution of a modified whey protein and insoluble whey solids. The water solution of the modified whey product can be used as an egg white substitute, e.g., in meringues. If the insoluble whey solids are rehydrolyzed, they too can be used as an egg white substitute.

10 Claims, No Drawings

PROCESS FOR FORMING AN EGG WHITE SUBSTITUTE

This is a continuation, of application Ser. No. 582,489 filed May 30, 1975 now abandoned.

TECHNICAL DESCRIPTION OF THE INVENTION

The present invention relates to a process for forming an egg white substitute and to the product formed by such a process.

A number of prior art processes for forming an egg white substitute from whey proteins have been proposed. For example, in Netherlands Patent Application No. 72/14,837 (abstracted under Derwent Accession No. 37,726 V), in "Whipping Studies with Partially Delactosed Cheese Whey", by P. Jelen, in the Journal of Dairy Science, Vol. 56, No. 12, pp 1505-1511, and in U.S. Pat. No. 3,583,968, heat treatment and pH adjustment procedures were advocated for formation of such products. The addition of hydrate of lime to a whey solution to form two liquid fractions was advocated in U.S. Pat. No. 1,787,754 to Elizabeth M. Meyer. Adjustment of the pH of the whey solution to about 9-10.5 with subsequent filtration was advocated in U.S. Pat. No. 2,695,235 to B. deGoede. Each of these approaches have certain disadvantages. The first three enumerated procedures require heating with consequent expenditure of energy and the latter two give a product having inferior utility particularly when the product is used in an egg meringue.

The present invention, in general terms, comprises adjusting the pH of a whey protein solution to a value of from about 11 to about 13 followed by a subsequent adjustment of the pH to a value of from about 4.0 to about 6.0 to yield a supernatant solution and a precipitate. This procedure is carried out in the absence of any heat treatment. The supernatant can be used as an egg white substitute. If the insolubles are rehydrolyzed at an alkaline pH of from about 11 to about 13 they also can be so used as an egg white substitute.

When liquid cheese whey is used as a starting material in the present invention it can be selected from a wide variety of wheys including both sweet and acid wheys. Examples are cheddar, cottage, cream, Swiss, ricotta and mozzarella. Also intended to be included within the term "cheese whey" are a number of whey protein concentrates. Such concentrates can be made by a number of processes including: an electrodialysis procedure (e.g., as described by Stribley, R. C., Food Processing, Vol. 24, No. 1, p. 49, 1963); by reverse osmosis; by ultrafiltration (e.g., as described by Horton, B. S. et al., Food Technol., Vol. 26, p. 30, 1972); by alcohol precipitation (e.g., Morr et al. J. Dairy Sci., Vol. 53, p. 1162, 1970); or by gel filtration. When the latter procedure is followed the starting material for use with the present invention can be the partially delactosed, demineralized product resulting from treatment of cheese whey with a divalent metal ion and adjustment of the pH to a value above 6 at a temperature below 140° F. in accordance with the teachings of U.S. Pat. No. 3,560,219 to Attebery followed by a concentration step to crystallize the lactose. This partially delactosed liquor can alternatively be passed through the bed of a molecular sieve resin in accordance with U.S. Pat. No. Re. 27,806 to Dienst et al. to yield two fractions which can be used as starting materials for this invention, if desired. The first comprises mainly protein with residual lactose and minerals and is available commercially under the name ENRPRO® from Stauffer Chemical Company, Food Ingredients Division, Westport, Connecticut. It comprises 40-30% by weight protein (N×6.38), 10-30% lactose, 3-15% ash, 0.5-4% fat, 0.7-3.3% lactate and 0.6-1.7% citrate. The second fraction contains mainly lactose and minerals with residual protein. It is available as ENR-EX® from Stauffer Chemical Company, Food Ingredients Division, Westport, Connecticut. It comprises 40-50% lactose, 25-35% minerals, 15-20% protein (N×6.38), 7-10% lactic acid, 3-6% citric acid, less than 1% fat, and less than 5% moisture.

If vegetable whey is intended to be used it can be selected from a large number of wheys including soy whey, cottonseed whey and coconut whey, which are preferred. Others include sesame seed, rapeseed, sunflower seed, mung bean and Great Northern bean wheys.

In order that the whey proteins might be converted into an egg white substitute it is necessary according to the present invention to treat the normally acidic solution of whey proteins with an effective amount of a base or an ion exchange resin in the hydroxy form to give a pH to the solution of from about 11 to about 13, preferably from about 11 to about 12. The most preferred pH is from about 11.5 to 11.9. This is preferably done at ambient temperature, e.g., from about 15° C. to about 25° C., and the whey solution is preferably allowed to remain at that pH for about 60 to about 180 minutes. The total solids content of the solution is from about 5% to 25% by weight. Any food grade base can be used to adjust the pH, such as sodium hydroxide, the preferred base, potassium hydroxide, calcium hydroxide and ammonium hydroxide.

Subsequent to treatment with base, the solution is acidified to a range of from about 4.0 to about 6.0, preferably about 4.2 to about 5.0 (most preferably about 4.6), after prior pH adjustment to 11-13 is accomplished, using any acid which is non-toxic and which is acceptable for food use. A preferred acid is hydrochloric acid. This acid adjustment is also preferably carried out at a temperature of from about 15° C. to about 25° C. This procedure will yield a supernatant solution containing the desired modified whey product and a precipitate. These two can be easily separated from one another by settling and decantation, by centrifugation, or by any other conventional means known to the art. The latter specifically enumerated separation technique is preferred since it is faster and gives a greater degree of separation.

The modified whey product in the supernatant differs in protein content from a product obtained by either treating a whey protein with base alone or from the insoluble material formed when the applicants' process is used. The modified whey product has a protein content of from about 20% to about 30%, by weight. It also has unique functionality as an egg white substitute as is shown in the examples which follow.

The insoluble product resulting from the present process can be converted into a product having utility as an egg white substitute, e.g., in a soft meringue and in angel food cake, if it is subsequently hydrolyzed at an alkaline pH of about 11 to about 13. The solution resulting therefrom is whippable but does not have the sugar retention characteristics required for certain products, e.g., a hard meringue. It can be used, however, to form such products as a soft meringue, an angel food cake, and the like. The insoluble product should remain at this alkaline pH for an extended length of time, e.g., about 3 to about 24 hours, at a temperature of from 20° C. to 40° C. to form this useful product containing a modified whey product whose structure has not been fully characterized. When this product is to be used in food products, e.g., meringues, which require the presence of low amounts of fat, e.g., below about 1-2%, by weight, it is advantageous to reduce the fat content, e.g., by extraction with a suitable organic solvent, such as petroleum ether, or by other conventional means.

every 15 seconds during beating until the total mixing time totaled to 6 min. The mixing was continued at a speed of 3 until the mix reached the stiff peak stage. Each sample was then baked at 275° F. for 90 minutes inside a reel oven.

The Table given below sets forth the batch formulations for the various samples that were made from the three general types of replacement products described above. All numbers indicate the amount, in grams, of the various ingredients. The abbreviation R.P. followed by a Roman numeral indicates the particular type of replacement product used.

TABLE

| Component | 1 | 2* | 3* | 4* | 5*** | 6+ | 7** | 8** |
|---|---|---|---|---|---|---|---|---|
| Dry egg albumen (Henningsen, type P-11) | 15 | 7.5 | 7.5 | 7.5 | 7.5 | 7.5 | — | — |
| Monocalcium phosphate, anhydrous | 0.52 | 0.52 | 0.52 | 0.52 | 0.52 | 0.52 | 0.26 | 0.52 |
| R.P. I | — | 12.2 | — | — | — | — | — | — |
| R.P. II | — | — | 8.04 | — | — | — | — | — |
| R.P. III | — | — | — | 22.7 | — | — | — | — |
| R.P. III | — | — | — | — | 7.5 | — | — | — |
| R.P. III (adj. to pH = 7.0) | — | — | — | — | — | 15.3 | — | — |
| R.P. III | — | — | — | — | — | — | 15.3 | — |
| R.P. III (adj. to pH = 7.0) | — | — | — | — | — | — | — | 15.2 |
| Sugar | 297 | 297 | 297 | 297 | 297 | 297 | 297 | 297 |
| Water | 135 | 135 | 135 | 135 | 135 | 135 | 135 | 135 |

*amount of replacement product is a 50% replacement based on the protein content of the albumen.
**amount of replacement product is a total 100% replacement based on the weight of egg albumen.
***amount of replacement product is a 50% replacement based on the weight of egg albumen.
+the amount of replacement product is a 57% replacement based on the protein content of egg albumen.

The present invention is further illustrated by the following Examples:

EXAMPLE 1

About 800 grams of a modified whey product formed from the first fraction obtained by passing partially delactosed cheese whey mother liquor through a molecular sieve resin, as described in U.S. Pat. No. Re. 27,806, (available commercially as ENRPRO® 50 from Stauffer Chemical Company, Food Ingredients Division, Westport, Connecticut) was added to about 4200 ml. of water to form a dispersion having a solids content of about 16%, by weight. This dispersion was treated with 1 N NaOH at 24°-25° C. to adjust the pH to about 11.7 and was allowed to remain for 90 minutes at this pH. This solution was adjusted to neutrality. The product thus obtained will be referred to hereinafter as replacement product I [R.P. I] on the Table set forth below. Two other replacement products were also formed. They were the precipitate (adjusted to neutrality) [R.P. II] and the supernatant fraction (without pH adjustment) [R.P. III] isolated by centrifugation after the first type of replacement product [R.P. I] had its pH adjusted to about 4.6. The third type of replacement product is, of course, the product of this invention. All three types of replacement products were freeze dried before use as a replacement for dry egg albumen in forming of the meringues.

Egg meringues were prepared by dissolving either egg albumen and/or one of the replacement products in the proper amount of water, as described below, and allowing them to hydrate for one hour. The amount of monocalcium phosphate, anhydrous, set forth below was added, and the mixture was mixed for 15 min. It was then poured into a Hobart C-100 mixer equipped with a 3 quart bowl and was whipped at a speed of 3. After an initial 30 sec. beating time, sugar, in the amount described below, was added in 1 tablespoon increments The following physical characteristics were noted:

| Sample No. | Mixing Time | Foam Sp. Gravity | Sp. Volume | pH |
|---|---|---|---|---|
| 1 | 10 min. | 0.369 (g/cc) | 7.21 (cc/g) | 5.9 |
| 2 | 30 min. | 0.463 | 5.89 | 6.0 |
| 3 | 30 min. | 0.569 | 4.93 | 5.9 |
| 4 | 10 min. | 0.281 | 7.21 | 4.8 |
| 5 | 15 min. | 0.350 | 6.94 | 5.0 |
| 6 | 10 min. | 0.356 | 6.92 | 6.0 |
| 7 | 8.5 min. | 0.250 | 6.89 | 4.8 |
| 8 | 6.0 min. | 0.250 | 9.09 | 6.0 |

An evaluation of the egg meringues made from the samples gave these results:

No. 1 - Sample showed firm peaks, no collapsing or cracking, very white. It was a good hard shell meringue (control).

No. 2 - Sample did not whip beyond the soft peak stage and baked into a flat, brown shell with no peaks. It cannot be classified as a meringue (R.P. I).

No. 3 - Sample showed no evidence of an ability to whip. It remained watery and did not reach the soft peak stage. It retained no shape and baked into a very flat, brown shell. It is not functional as a hard meringue (R.P. II).

No. 4 - Sample has very great foaming capacity and whips up faster and has greater volume than the control (No. 1). It baked into hard shell meringue with volume equal to the control. The sample held very stiff peaks and remained white in color (R.P. III).

No. 5 - Sample formed a hard shell meringue with high volume (slightly less than No. 1 and No. 4) but it is tan in color and has lost some of the peaks. The remaining peaks have remained stiff (R.P. III).

No. 6 - Sample has large volume but is tan and flat; slightly cracked surface, few peaks. It is a poor quality meringue (R.P. III. adj. to pH = 7).

No. 7 - Sample whips into stiff peaks faster than No. 1. It baked into a hard shell meringue with good volume; stiff peaks, very white (R.P. III).

No. 8 - Sample has very large volume but is brown (pH 6.0), flat and collapsed with a hollow interior; very slightly cracked porous exterior, few peaks, no resemblance to a hard egg meringue (R.P. III, adj. to 7 pH).

Of all the samples tested above, only those containing the water solution of modified whey and having a pH of between about 4.5 and 6.0 formed acceptable meringues. These products have good foaming properties which allow them to entrap air during the whipping process and bake into a good hard egg meringue having a high volume.

EXAMPLE 2

Spray dried sweet whey, available commercially as Krafen ® from Kraftco, was used as a starting material. One hundred grams dispersed in 300 ml. of H₂O was adjusted to a pH of 11.4 by addition of sodium hydroxide and was held at this pH for 90 minutes at room temperature. The pH was then adjusted to 4.6, and the resulting slurry was centrifuged to obtain the supernatant solution and was freeze dried.

The dried supernatant was used as a partial replacement for dry egg albumen in forming a meringue. Seven and one half grams of Henningsen egg albumen (type P-11), 0.52 g. of monocalcium phosphate, anhydrous, 27.8 g. of the dried supernatant obtained above, 297 g. of sugar and 135 g. of water were mixed as outlined in Example 1. Its mixing time was 20 minutes, the foam had a specific gravity of 0.344 g./cc. and a pH of 4.7. The sample was then baked in a rotating oven at 275° F. for 90 minutes and was evaluated. The meringue had a specific volume of 5.98 cc./g. and a tan hard shell with stiff peaks, a slightly cracked surface and a hollow interior.

EXAMPLE 3

This Example demonstrates that merely using high alkaline treatment of the whey protein will not produce a product having good utility as an egg white substitute as opposed to the separation of soluble and insoluble fractions at a pH of 4.6 as in Example 1.

The modified whey product used in Example 1 was placed in water so that a 10–20% by weight water dispersion resulted. The pH of this dispersion was adjusted to various pH levels either by passing it through an anionic exchange resin (Duolite A-102D, OH form) or by the direct addition of 1 N sodium hydroxide. The dispersions were held at these pH values for a variety of time periods. The percent denatured proteins in the food product was determined as a % of the total protein (15% trichloroacetic acid precipitable protein) by determining the amount of precipitable proteins at a pH of 4.6. The Table sets forth the results:

| Sample No. | pH | Temp. | Time (min.) | Means of Adjusting pH | % Denatured Protein |
|---|---|---|---|---|---|
| 1 | 11.0 | 24–25° C. | 60 | NaOH | 32.8 |
| 2 | 11.4 | 24–25° C. | 80 | Resin | 49.9 |
| 3 | 11.75 | 24–25° C. | 60 | Resin | 45.7 |
| 4 | 11.7 | 24–25° C. | 90 | NaOH | 48.1 |

Hard egg meringues were prepared from the samples held at pH values of 11.0, 11.4 and 11.7 (Samples 1, 2 and 4, above) replacing 50% of the required egg albumen, based on the weight of protein. These are labelled Products "A" through "C" in the Table given below. Monocalcium phosphate, anhydrous was added to all formulations as a source of divalent calcium cations to increase the heat coagulability of the product.

The following Table sets forth the amount in grams of the ingredients used in formulating the meringues:

| Ingredient | Control | 1 | 2 | 3 |
|---|---|---|---|---|
| Dry egg albumen (Henningsen, P-11) | 15 | 7.5 | 7.5 | 7.5 |
| Product A | — | 12.24 | — | — |
| Product B | — | — | 12.17 | — |
| Product C | — | — | — | 12.24 |
| Monocalcium phosphate, anhydrous | 0.52 | 0.52 | 0.52 | 0.52 |
| Sugar | 297 | 297 | 297 | 297 |
| Water | 135 | 135 | 135 | 135 |

The procedure for formulating the meringues from the above ingredients is as follows:

1. The albumen or albumen/modified whey product was dissolved in the water and was hydrated for one hour. The monocalcium phosphate was added, and the mixture was mixed for 15 minutes;
2. The solution was poured into the bowl (3 quarts) of a Hobart C-100 mixer with wire whip and was mixed at speed No. 3 for 30 seconds. The sugar was added in one tablespoon increments every 15 sec. up to a total mixing time of 6 minutes;
3. Mixing was continued at high speed until the meringue reached the greatest degree of peaking; and
4. The formulation was baked at 275° F. (135° C.) for 90 min.

The control formed a hard shell meringue with stiff, very white peaks. There was no evidence of collapsing or cracking. All the other samples formed meringues which did not whip very well. All remained soft and none reached the stiff peak stage even with an extended whipping time. All formed a flat, cracked brown shell with no peaks. All were unacceptable as hard meringues.

The Table given below sets forth the mixing time, specific gravity, pH of the foams and specific volume of the meringues from the control and the three experimental formulations:

| Sample No. | Mixing Time(min.) | Sp. Grav. | Sp. Vol. | pH |
|---|---|---|---|---|
| Control | 10 | 0.369 | 7.21 | 5.9 |
| 1 | 30 | 0.463 | 5.42 | 5.9 |
| 2 | 30 | 0.450 | 5.40 | 5.9 |
| 3 | 30 | 0.463 | 5.89 | 6.0 |

EXAMPLE 4

This Example illustrates the difference in protein content between three differing fractions obtained using the modified whey product of Example 1 as a starting material. The first fraction (hereinafter "Fraction 1") was obtained by treating the whey product with base to adjust the pH to 11.7. The second ("Fraction 2") is the soluble portion from treatment of the whey product in accordance with this invention. The third ("Fraction 3") is the insoluble portion resulting from the present invention which has no utility as an egg white substitute unless it is rehydrolyzed.

| Fraction | Total Protein (%) (N × 6.38) | Non-Protein** Content |
|---|---|---|
| 1 | 46.4 | — |
| 2* | 26.2 | 14.9 |
| 3 | 72.6 | 2.4 |

*product of the present invention.
**nitrogen that is soluble in 15% trichloracetic acid × 6.38.

EXAMPLE 5

This Example illustrates that when a known prior art process, i.e., the one shown in Meyer U.S. Pat. No. 1,787,754, is used on spray dried sweet whey, the product that results does not have utility as an egg white substitute. One hundred grams of spray dried sweet whey (Krafen ®, from Kraftco) was dry blended with about 3.5% by weight, based on the weight of whey, of lime and about 1%, by weight, of potassium nitrate. Water was added to give a 25% solids dispersion which turned milky white. This was centrifuged, and the supernatant at a pH of 11.4 was separated. This solution contained albumin and lactose. It was placed in a refrigerator overnight followed by 90 minutes storage at room temperature. The solution was divided into three portions which were adjusted to a pH of 4.6 ("Portion 1"), 7.0 ("Portion 2") and 11.0 ("Portion 3"), respectively.

All three of the above portions were freeze dried and were evaluated in hard egg meringues using the procedure described in Example 4. The following ingredients, (weight in grams) were used (Sample No. 1 being a control using dry egg albumen):

| Ingredient | SAMPLE | | | | |
|---|---|---|---|---|---|
| | 1 | 2 | 3 | 4 | 5 |
| Dry egg albumen (Henningsen, P-11) | 15 | 7.5 | 7.5 | 7.5 | 7.5 |
| Monocalcium phosphate, anhydrous | 0.52 | 0.52 | 0.52 | 0.52 | 0.52 |
| Portion 1 | — | 26.7 | — | — | — |
| Portion 2 | — | — | 26.7 | — | — |
| Portion 3 | — | — | — | 26.7 | — |
| Product of this invention* | — | — | — | — | 27.8 |
| Sugar | 297 | 297 | 297 | 297 | 297 |
| Water | 135 | 135 | 135 | 135 | 135 |

*formed by adjusting a solution containing spray dried sweet whey to a pH of 11.4 with NaOH, holding it at this pH for 90 minutes at room temperature, adjusting the pH to 4.6, centrifuging and separating the supernatant which also has a pH of 4.6.

The following results were noted:
Sample No. 1 showed firm peaks, with no collapsing or cracking. It was a good hard shell meringue and was very white.
Sample No. 2 formed a tan hard shell meringue with soft peaks, large cracks, a hollow interior, and poor texture.
Sample No. 3 was sunken in the center and had a very cracked surface. It had no peaks, was brown, and had a poor texture.
Sample No. 4 formed a hard, flat shell with deep cracks. It had a hollow interior, was collapsed, and had no peaks evident.
Sample No. 5 (containing the product of this invention) formed a tan hard shell meringue; which was similar to No. 2 but had a higher volume and stiffer peaks. It had a slightly cracked surface and a hollow interior.

All of the samples produced in accordance with the Meyer patent produced poor quality meringues and showed a decrease in the degree of whippability of the samples as the pH of the supernatant increased. The product formed in accordance with this invention produced a much better meringue than any of those prepared according to the Meyer patent.

The following characteristics were noted for the foams:

| Sample No. | Mixing Time(min.) | Sp. Gravity | Sp. Volume | pH |
|---|---|---|---|---|
| 1(Control) | 10 | 0.369 | 7.21 | 5.9 |
| 2 | 25 | 0.413 | 5.59 | 5.1 |
| 3 | 25 | 0.438 | 5.83 | 6.0 |
| 4 | 25 | 0.438 | 5.10 | 10.1 |
| 5 | 20 | 0.344 | 5.98 | 4.7 |

EXAMPLE 6

This Example illustrates the superior results obtained when the process of the present invention is used rather than the process described in U.S. Pat. No. 2,695,235 to deGoede.

A 65% dispersion of dried sweet whey was adjusted to a pH of 11 using sodium hydroxide. Dry ice (carbonic acid) was immediately added to lower the pH to 8.5. The material was then centrifuged to remove the precipitate, and the supernatant was filtered using a filter-aid (Celite 545, from Johns-Manville) and was freeze dried. This became Sample No. 1 after it was formed into a hard egg meringue, as described above, as a 100% replacement for egg albumin on a weight basis.

A second sample was prepared similarly as the first sample except a 30% dispersion of the modified whey product formed in accordance with U.S. Pat. No. Re. 27,806, and available commercially as ENRPRO ® 50 was used. This sample (No. 2) was used in forming a hard egg meringue as a 100% replacement for egg albumen.

Two other egg meringues were prepared: one, a product of this invention, e.g., the pH 4.6 soluble fraction of pH modified ENRPRO ® 50, (Sample No. 3) and a control containing egg albumen (Henningsen's P-11) (Sample No. 4).

The following results for the meringue were noted:

| Sample No. | Sp. Gravity | Sp. Vol. | pH | Observations |
|---|---|---|---|---|
| 1 | 0.625 | 4.06 | 8.3 | Flat, brown, fragile |
| 2 | 0.450 | 3.75 | 8.6 | Flat, brown, cracked, no peaks |
| 3 | 0.256 | 8.66 | 4.7 | White, stiff peaks |
| 4 | 0.369 | 7.21 | 5.9 | Very white, firm peaks |

EXAMPLE 7

This Example demonstrates the procedure used to convert the insoluble fraction obtained by using the present invention into a useful product.

The insoluble fraction was hydrolyzed into five products according to the Table set forth below:

| Product | pH | Temp. (°C.) | Time (hrs.) |
|---|---|---|---|
| A | 11.7 | 25 | 8 |
| B | 11.7 | 25 | 16 |
| C | 11.7 | 35 | 3 |
| D | 11.7 | 35 | 5 |
| E | 11.0 | 25 | 21 |
| | + | + | + |
| | 11.0 | 35 | 3 |
| | + | + | + |
| | 11.7 | 35 | 2 |

At the end of the hydrolysis treatment the trace amount of insolubles that remained was removed by centrifugation. The supernatant containing the functional fraction was then neutralized to a pH of 7.0. These products after drying were then used as a 50% replacer for egg albumen in a soft meringue.

The following Table sets forth the amount in grams of the ingredients used in formulating the meringue:

|  |  | SAMPLES (wt. in grams) | | | | |
|---|---|---|---|---|---|---|
| Ingredient | Control | 1 | 2 | 3 | 4 | 5 |
| Dry egg albumen (Henningsen, P-20) | 11.25 | 5.625 | 5.625 | 5.625 | 5.625 | 5.625 |
| Product A | — | 5.625 | — | — | — | — |
| Product B | — | — | 5.625 | — | — | — |
| Product C | — | — | — | 5.625 | — | — |
| Product D | — | — | — | — | 5.625 | — |
| Product E | — | — | — | — | — | 5.625 |
| Corn Starch | 3.125 | 3.125 | 3.125 | 3.125 | 3.125 | 3.125 |
| Salt | 0.313 | 0.313 | 0.313 | 0.313 | 0.313 | 0.313 |
| Monocalcium phosphate, anhydrous | 0.313 | 0.313 | 0.313 | 0.313 | 0.313 | 0.313 |
| Sugar | 285 | 285 | 285 | 285 | 285 | 285 |
| Water | 200(ml.) | 200(ml.) | 200(ml.) | 200(ml.) | 200(ml.) | 200(ml.) |

The following procedure was used:
1. the albumen or Products A-E were dry blended with the corn starch, salt, monocalcium phosphate, and 10 g. of sugar in a Hobart C-100 mixer with a paddle attachment at Speed No. 1 for two minutes;
2. the water was added;
3. the mixture was whipped with a wire whip at Speed No. 2 for 5 minutes;
4. the whipping was continued for about 12 to 15 minutes until a stiff peak was produced. The remaining sugar (275 g.) was added gradually during the whipping; and
5. the formulation was baked at 425° F. (218° C.) for 6 minutes.

The Table set forth below gives the mixing time, specific gravity and pH of the foams and specific volume of the meringues for the Control and the five experimental samples (Samples 1-5):

| Sample No. | Mixing Time (min.) | Foam Sp. Grav. | Meringue Sp. Vol. | pH |
|---|---|---|---|---|
| Control | 12 | 0.225 | 5.41 | 6.2 |
| 1 | 14 | 0.287 | 4.68 | 5.8 |
| 2 | 14 | 0.280 | 4.68 | 6.1 |
| 3 | 14 | 0.312 | 4.25 | 6.2 |
| 4 | 14 | 0.280 | 8.03 | 6.2 |
| 5 | 12 | 0.219 | 6.26 | 6.0 |

EXAMPLE 8

This Example demonstrates the utility of the pH 4.6 soluble and rehydrolyzed pH 4.6 insoluble fractions of the pH treated whey product of Example 1 in an angel food cake. The insoluble fraction was rehydrolyzed at a pH of 11.7 for 3 hours at 35° C. after the separation of the pH 4.6 soluble fraction at the end of 1½ hours.

A mixture of the following ingredients was made:

| Mixture A | |
|---|---|
| Ingredient | Amount (g.) |
| Egg white solids (Henningsen, P-20) | 42.5 |
| Granulated sugar | 80.0 |
| Monocalcium phosphate, anhydrous | 1.2 |
| Salt | 2.0 |
| Water | 296.0 |

The above solid ingredients were blended dry and were added to the water at 70°-75° F. in a mixing bowl. A speed of 1 in a Hobart C-100 mixer was used, and the mixture was beaten for about 1 minute. It was then beaten at speed No. 2 for an additional minute to insure thorough wetting of the ingredients. The mixer speed was then moved to No. 3 and mixing was continued until the meringue formed stiff peaks, e.g., in 1-2 minutes.

A second mix of ingredients was also prepared:

| Mixture B | |
|---|---|
| Ingredient | Amount (g.) |
| Granulated sugar | 248.0 |
| Wheat starch (Starbake, non-gelatinized starch) | 16.3 |
| Monocalcium phosphate, anhydrous | 5.0 |
| Baking soda | 1.45 |
| Cake flour (Sno-sheen) | 90.0 |

Mixture B, whose ingredients had been previously mixed and sifted three times, was then folded into the meringue in approximately four equal portions. The resulting mixture was baked in a 10 inch angel food cake pan for 60 minutes at 360° F. The Table set forth below describes the properties of the above cake, of one having 5% of the egg white removed and replaced with the pH 4.6 soluble fraction and of cakes having 5% and 10% of the egg white removed and replaced with the rehydrolyzed pH 4.6 insoluble fraction.

| Sample | Whip time (sec.) | Sp. Gravity Foam | Sp. Gravity Batter | Cake Sp. Vol. |
|---|---|---|---|---|
| egg albumen (Henningsen, P-20) | 95 | 0.105 | 0.295 | 5.20 |
| Solubles (pH = 4.6) | 160 | 0.135 | 0.340 | 4.63 |
| Rehydrolyzed insolubles* | 160 | 0.115 | 0.295 | 5.27 |
| Rehydrolyzed insolubles** | 160 | 0.110 | 0.305 | 4.70 |

*as 5% replacer for egg white
**as 10% replacer for egg white

The above Examples illustrate certain preferred embodiments of the invention. The scope of protection desired is set forth in the pending claims.

What is claimed:

1. A process for forming an egg white substitute which consists of adjusting the pH of a solution containing a whey protein to a value of from about 11 to about 13, thereafter reducing the pH of the solution to a value of from about 4.0 to about 6.0 to thereby yield a water solution of a modified whey product and insoluble whey solids, and separating the water solution of the modified whey product to yield said water solution as the egg white substitute.

2. A process as claimed in claim 1 wherein the pH is first adjusted to a value of from about 12 to about 13.

3. A process as claimed in claim 1 wherein the pH is first adjusted to a value of from about 11.5 to about 11.9.

4. A process as claimed in claim 1 wherein the whey protein is kept at a pH of from about 11 to about 13 for about 60 to about 180 minutes.

5. A process as claimed in claim 1 wherein the whey protein is a cheese whey protein.

6. A process as claimed in claim 5 wherein the cheese whey protein is the first fraction obtained by passing partially delactosed cheese whey through the bed of a molecular sieve resin.

7. A process as claimed in claim 1 wherein the whey protein is a vegetable whey protein.

8. A process as claimed in claim 1 wherein the pH is thereafter reduced to a value of from about 4.2 to about 5.0.

9. A process as claimed in claim 1 wherein the pH is thereafter reduced to a value of about 4.6.

10. A process as claimed in claim 1 which further includes rehydrolyzing the insoluble whey solids at a pH of from about 11 to about 13.

* * * * *